UNITED STATES PATENT OFFICE.

MORRIS WISE, OF NEW YORK, N. Y., ASSIGNOR TO HIMSELF AND LOUIS STETTAUER, OF SAME PLACE.

IMPROVEMENT IN THE PREPARATION OF DYE-STUFFS.

Specification forming part of Letters Patent No. 221,381, dated November 4, 1879; application filed July 31, 1879.

*To all whom it may concern:*

Be it known that I, MORRIS WISE, of the city, county, and State of New York, have invented a new and useful Improvement in Dye-Stuffs, which improvement is fully set forth in the following specification.

This invention relates to an improved dye-stuff obtained from the leaves of the pimento tree.

My invention has for its object to extract the coloring-matter from pimento leaves, after being deprived of the essential oil, without subjecting the same to the action of heat or to a boiling process, which would injure the resultant extractive coloring-matter; and to this end my invention consists in leaching the pimento leaves, after the removal of the essential oil, with cold water, to remove the extractive dyeing-matter, whereby a dye-stuff is produced capable of being used for dyeing leather, but specially designed for dyeing fabrics.

In carrying out my invention, I first carefully extract from the pimento leaves all the essential oil contained therein, which is effected by placing the said leaves on perforated or foraminous shelves or platforms in a suitable vessel, and then subjecting the same to the action of a current of steam, which is caused to pass through or over the shelves or platforms therein, whereby the steam is caused to permeate said leaves and volatilize and carry off the essential oil.

After the essential oil has been thus removed the leaves are placed in a suitable tank or vessel, and are subjected to the action of cold water for about one week, when the liquid is removed by pressure and again poured over and upon the leaves remaining in the tank or vessel, and there left for several days, when it is again removed, as before stated. The liquid extract thus obtained is then poured over a fresh quantity of leaves, and is left in contact therewith for about one week, when it is removed in the manner before mentioned and evaporated in a suitable vessel until it assumes the consistency of sirup or molasses, when it is ready for use. It has a dark-brown color, perfectly free from oily matter, is easily soluble in water, and imparts to cotton without a mordant, a yellowish gray color which resists soap, and appears to be perfectly fast.

By using suitable mordants on the cotton different colors can be produced with my dye-stuffs—for instance, with sulphate of iron different shades of gray can be obtained.

I do not claim anything shown or described in the United States Letters Patent No. 196,339, or English patent No. 4,992, of the year 1876, for in the same a dyeing-matter has been obtained by first macerating or grinding pimento leaves and then boiling the same in water and condensing the liquid, or by infusing the broken leaves in cold water for use without condensation, for the products thus obtained have an admixture of essential oil or fatty matter which is not found in the dye-stuff produced under my invention.

What I claim as new, and desire to secure by Letters Patent, is—

A dye-stuff produced from pimento leaves by means substantially as herein described, or by any other means that will produce a like result.

In testimony that I claim the foregoing I have hereunto set my hand and seal this 14th day of July, 1879.

MORRIS WISE. [L. S.]

Witnesses:
 W. HAUFF,
 CHAS. WAHLERS.